US008407082B2

(12) United States Patent
Dixon et al.

(10) Patent No.: US 8,407,082 B2
(45) Date of Patent: Mar. 26, 2013

(54) AGGREGATION OF VALIDATED TRANSACTIONS FOR SETTLEMENT

(75) Inventors: Phil Dixon, San Diego, CA (US); Khalid El-Awady, Mountain View, CA (US)

(73) Assignee: Visa U.S.A. Inc., San Francisco, CA (US)

(*) Notice: Subject to any disclaimer, the term of this patent is extended or adjusted under 35 U.S.C. 154(b) by 1121 days.

(21) Appl. No.: 11/681,176

(22) Filed: Mar. 1, 2007

(65) Prior Publication Data
US 2008/0183589 A1 Jul. 31, 2008

Related U.S. Application Data

(60) Provisional application No. 60/887,307, filed on Jan. 30, 2007.

(51) Int. Cl.
*G07B 15/00* (2011.01)
*G06Q 20/00* (2012.01)
*G06K 5/00* (2006.01)

(52) U.S. Cl. ............................. 705/13; 705/17; 235/382

(58) Field of Classification Search ......................... None
See application file for complete search history.

(56) References Cited

U.S. PATENT DOCUMENTS

| | | | | |
|---|---|---|---|---|
| 7,873,594 B2 * | 1/2011 | Harada et al. | ................. | 707/603 |
| 2004/0103057 A1 * | 5/2004 | Melbert et al. | ................. | 705/38 |
| 2005/0289231 A1 * | 12/2005 | Harada et al. | ................. | 709/224 |
| 2006/0278704 A1 * | 12/2006 | Saunders et al. | ............... | 235/382 |
| 2007/0131761 A1 | 6/2007 | Smets et al. | | |
| 2008/0156873 A1 | 7/2008 | Wilhelm et al. | | |
| 2008/0242355 A1 * | 10/2008 | Yu et al. | ........................ | 455/558 |
| 2009/0283591 A1 * | 11/2009 | Silbernagl | ..................... | 235/382 |
| 2011/0087630 A1 * | 4/2011 | Harada et al. | ................. | 707/603 |

FOREIGN PATENT DOCUMENTS
WO WO 2006/124808 11/2006

OTHER PUBLICATIONS

International Search Report and Written Opinion corresponding to the PCT application No. PCT/US07/82887, date of mailing May 7, 2008, 7 pages total.
Office Action mailed Jun. 5, 2012 in U.S. Appl. No. 12/883,919, 17 pages.

* cited by examiner

*Primary Examiner* — Mussa A Shaawat
(74) *Attorney, Agent, or Firm* — Kilpatrick Townsend & Stockton LLP

(57) ABSTRACT

At each of a plurality of merchant Point Of Service terminals (POS), for each of a plurality of consumers, where each consumer seeks to conduct a transaction with the merchant for a good or service by using a payment device issued by an issuer in a payment system, data is read from the payment device. The data can include an identifier for an account issued by an issuer. The consumer is permitted to receive the good or service from the merchant prior to validating the account with the issuer. Transaction information for each transaction is stored during a predetermined aggregation criteria, such as time period, number of transactions, monetary volume, etc., into an aggregation set of said transactions. During the predetermined aggregation criteria, an evaluation is made, by communication with the corresponding issuer, whether the accounts in the aggregation set of transactions are valid.

30 Claims, 5 Drawing Sheets

AGGREGATION OF VALIDATED TRANSACTIONS FOR SETTLEMENT

CROSS-REFERENCE TO RELATED APPLICATION

This application claims priority to U.S. Provisional Application Ser. No. 60/887,307, filed on Jan. 30, 2007, titled "Contactless Bank Card Transit Payment", which is incorporated herein by reference.

BACKGROUND

The present invention relates generally to financial transactions, particularly to customers requesting credit transactions with merchants, and more particularly to financial transactions conducted with a financial institution portable payment device issued by a financial institution, such as a credit card that, that may be used both in a retail transaction and in a transit fare transaction.

Portable payment devices can take many forms and are used in a great variety of financial transactions. The portable payment devices can comprise, for example, smart cards, payment tokens, credit cards, debit cards, stored value cards, contactless cards, cellular telephones, Personal Digital Assistant (PDA) devices, key fobs, or smart cards. The financial transactions can involve, for example, retail purchases, transit fares, access to venues, etc. In all such transactions, the portable payment device users (consumers) are concerned with convenience and the merchants with whom they deal are concerned with ease of transacting with their customer-consumers.

Typically, financial institution portable payment devices issued by a financial institution (FIPPD) are used in an on-line fashion (e.g., a point of service that is connected to a payment processing system during a transaction). The information from the FIPPD may be transmitted on-line to an issuer during a retail payment transaction for purposes of authorizing the use of the FIPPD for that transaction. The issuer may review parameters of the transaction such as transaction amount, credit history, card authenticity, and other factors when determining whether or not to authorize or decline the transaction.

Some merchant transactions are so unconventional that on-line FIPPD authentication and verification schemes cannot be accommodated. For example, the ability to go on-line in a transit environment such as a subway or bus system, or a venue access environment such as a stadium or concert hall, may be problematic because of the lack of real time communication and lack of network systems for such environments. This is due in part to the need in such environments to process a transaction within about 300 ms, a transit system industry standard, and thereby allow 30 to 45 patrons per minute access into a facility of the transit system such as a subway or a bus. Moreover, a bus on an over-the-road bus route may not have wireless or other communication systems to allow any real-time dialogue with any other systems outside of the bus, such as for online fare assessment or online admission ticket/voucher/card authorization. As such, the transit fare payment and collection process cannot be performed effectively using a conventional on-line authentication and approval process. This absence of network connectivity in a transit environment presents a difficulty whenever effective fraud prevention requires an on-line authentication of the consumer's means of access, such as an admission ticket, voucher, or access card, in order to determine whether the consumer is entitled to access and has sufficient funds to cover the cost of the desired transaction (fare for riding on the transit system).

Further, conventional on-line modes of payment are challenged when the value of a transaction is not known during the time of rendering of a good or service. In a transit environment, a fare calculation may depend upon the actual travel distance, direction of travel, station entry and exit locations, mode of travel (subway, bus, water taxi), consumer category (student, senior), and/or times of use (peak, off-peak). Such parameters can be unknown prior to rendering the service.

Moreover, the fees levied in conventional on-line modes of payment make their application into the transit environment impractical. Such fees may be fixed fees, such as ten cents ($0.10 US) per transaction, or variable fees such as five percent (5%) of the transaction value. These fees are levied at each node in the authorization, settlement, and clearance phases of the collection process, namely by the acquirer, the payment processor, and the issuer who may each levy fees at various phases. Typically, transit transactions have nominal transaction values (e.g.; a typical transit fare is about two dollars ($2.00 US) thereby making the overall levied fee, relative to the transaction value, substantial. Supporting the application of these payment fees to each of thousands of fare transactions processed everyday may become too costly and burdensome for the transit system.

Traditionally, transit fare calculation and collection have occurred in a closed system involving an off-line scheme. In a closed system, the transit company may issue its own transit portable payment device, such as a read/write smart card, wherein the transit portable payment device carries the necessary credentials and data to allow completion of a transaction at the fare device itself (turnstile, farebox, or other Point of Service). In this case, there is no additional processing required at the time of the transaction outside of the interaction between the card and the fare device. Rather, the card is authenticated and read by the fare device, logic is performed by the fare device to apply transit system fare policy, and the card is updated (rewritten) to finalize the transaction details including a deduction of any stored value for the cost of fare. The fare device may additionally query a hot list, negative list, or black list utilizing the card number and/or other card-specific data which, if not on these lists, the transaction will be completed and the cardholder will be allowed access into a facility of the transit system such as a subway terminal or bus passenger compartment.

The closed transit system, however, has its drawbacks. In a closed transit system, the transit portable payment device and transit readers at each station or route must be able to perform fare computations based on data stored and retrieved from a rider's access card, and subsequent card terminals/readers must be able to access data written to the rider's access card at previous stations. This requirement places a significant processing burden on the transit system terminals and/or fare processing systems and increases the cost of implementing the infrastructure for such systems. As fare rates and other relevant information generally change over time, this also increases the demands placed upon such systems for maintenance of accuracy.

Moreover, one transit portable payment device may not be compatible with all of the fare devices within a rider's travel plan. This can become a significant problem if a consumer wishes to utilize more than one transit system during a day's commute, such as by using multiple transit agencies or venues within a single geographical area that provide ridership both in and among different jurisdictions, cities or locations.

The present transit environment presents several challenges, including:

A common necessity that there can be only one transit portable payment device for each transit agency or group of cooperating agencies that cannot be used for other such agencies or groups;

The desire to accommodate transit system user's transaction speed expectations while minimizing risk to the transit agency for collecting payment for services rendered; and The limitation that most financial institution portable payment devices are 'read-only' and do not have read/write capabilities at the Point of Service, with the consequence that such devices will not store the rider's transit chronology data—thus making the rider's fare calculations somewhat difficult with such devices.

In addition to the transit system rider's desire for a fast transaction speed when accessing a transit system facility, there are security and other risks associated with the use of a FIPPD that is designed for on-line authorization when it is otherwise used in an off-line transaction. These risks include, but are not limited to:

Authentication: the lack of card/terminal authentication creates a high potential for fraud through counterfeiting techniques;

Fraud: transit transactions cannot be authorized on-line in real time as designed. With such off-line transactions, a negative list (i.e., a list of rejected cards based on the unique card number) stored at each transit fare device is the primary mechanism to deter fraud. This is sub-optimal since the negative list would presumably grow unbounded as more FIPPD are issued;

Fare Cost Calculation: where the cost of a transit transaction is dependent upon the immediate rider history for the card (entry/exit/length of travel, transfers, etc.), the rider's transit fare cannot be calculated at each gate or farebox because the rider's immediate history of travel cannot be stored, written or resident on the FIPPD due to the requirements of the issuing financial institution;

Data Security/Storage: protection of cardholder data in a transit fare system may prove difficult. Tracking data in the form of a primary account number (PAN) for a FIPPD would require the transit system to collect and store this data securely, which is not something transit fare systems commonly do presently. If implemented, this requirement presents added cost and security concerns to both the transit system and its riders; and Certification: arranging for an issuer of the FIPPD (e.g., the banking organization) to approve of a particular card reader mechanism in a transit environment may prove difficult. Currently, FIPPD readers must be approved by financial payment organizations. This is not something transit system providers are required to do at present, and if implemented, adds additional costs including that of administrative overhead.

What is needed in the art is the payment and collection of transactions utilizing a FIDDP device within the above environments, including access fares to transit systems and venues, that overcome the challenges and disadvantages of the prior art.

SUMMARY

A payment transaction can be conducted in a combined off-line/on-line scheme utilizing a financial institution portable payment device (FIPPD). During a consumer's transaction with a merchant for a good or service, information from the FIPPD can be read at a point of service (POS) terminal. The transaction information can be sent off-line to a central server for processing while the consumer with the FIPPD receives the good or service associated with the transaction. After the consumer has received the good or service, the transaction value can be calculated at the central computer based on predetermined rules and/or policies. Once calculated, the central computer may conduct an on-line transmission of the calculated transaction value to a payment processing system, such as a credit card payment system, so that the merchant can collect the calculated transaction value from one or more members of the payment processing system.

In one implementation, a consumer (rider) may seek access into a transit facility at a transit POS terminal using a FIPPD associated with an account within a payment processing system. The transit POS may have a reader, such as a contactless card reader, that collects data from a data storage region of the FIPPD, including the FIPPD's account information. The data in the storage region of the FIPPD, along with other transaction information such as the time of day and transit POS location, after retrieving the same, can then be stored at a location such as a central computer. Without validating the transaction with the issue of the FIPPD, the consumer may receive the good or service associated with the transaction. Transaction information for each transaction is stored during a predetermined aggregation criteria, such as time period, number of transactions, monetary volume, etc., into an aggregation set of said transactions. During the predetermined aggregation criteria, an evaluation is made, by communication with the corresponding issuer, whether the accounts in the aggregation set of transactions are valid.

By way of example, but not by way of limitation, the evaluation can be a query that is conducted to validate the FIPPD that was used for the transaction. The validation may consist of a check against a list, an authorization received from an issuer, iterations thereof, or combinations of the forgoing.

Some time thereafter, and avoid transaction processing fees for each transaction assessed by the payment processing system, the merchant submits the uncollected transactions in the aggregated transaction set to the payment processing system for collection against each corresponding FIPPD.

BRIEF DESCRIPTION OF THE DRAWINGS

The subject invention will be described in the context of the appended drawing figures, where the same numbers are used throughout the disclosure and figures to reference like components and features.

DETAILED DESCRIPTION

Figure 1:
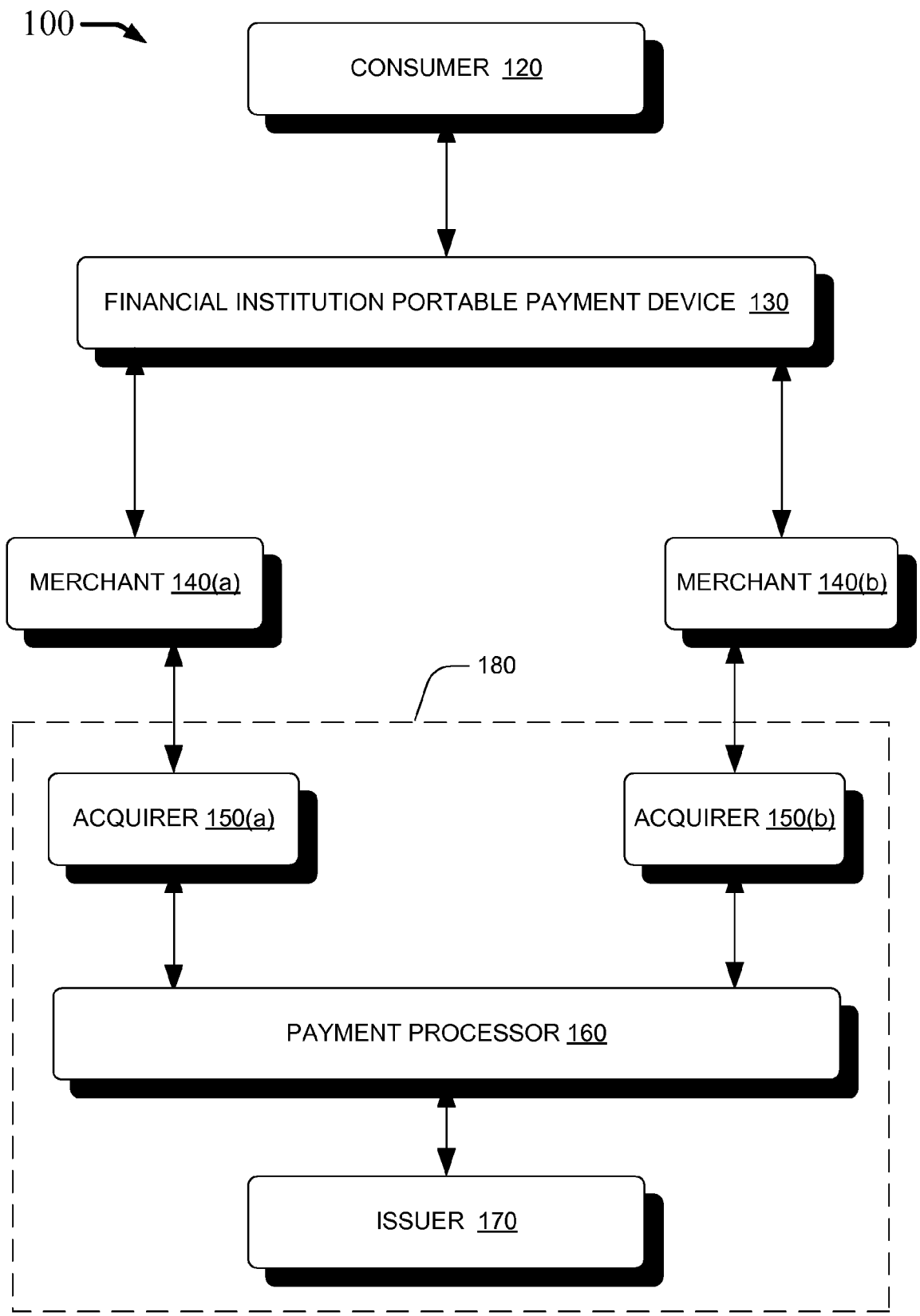
FIG. 1 is a block level diagram illustrating an exemplary payment processing system.

Implementations facilitate the payment and collection of transactions using a financial institution portable payment device (FIPPD) such as a contactless card or a program for use with a smart chip embedded in a mobile device such as a cellular telephone. The transaction value of each transaction is not known at the time that a consumer in the transaction receives from a merchant one or more goods or services associated with the transaction. Mechanisms are provided to curb fraud through the use of a negative list system, sometimes referred to as "black list" or "hot list."

As used herein, a FIPPD is intended to be broadly understood as being a portable payment device associated with a payment system. As such, the FIPPD may be a (handheld) device such a cellular telephone, a MP3 player, a Personal Digital Assistant (PDA), also include a keychain device (such as the Speedpass™ commercially available from Exxon-Mobil Corp.), a substrate bearing an optically scannable data region, a smart card, or integral and/or accessorized elements rendering the same functional equivalent of and to a contactless bank card associated with a payment system. A contactless payment device is a device that incorporates a means of communicating with a portable payment device reader or terminal without the need for direct contact. Thus, such portable payment devices may effectively be "swiped" by passing them close to the portable payment device reader or terminal. A smart chip is a semiconductor device that is capable of performing most, if not all, of the functions of a smart card, but may be embedded in another device. Such contactless devices typically communicate with the portable payment device reader or terminal using RF (radio-frequency) technology, wherein proximity to an antenna causes data transfer between the portable payment device and the reader or terminal.

Prior to further discussing the use of the FIPPD that is capable of combined payment and transit functions, and the possible scenario of an issuer acting as an intermediary or trusted third party, a brief description of the standard electronic payment operation will be presented. Typically, an electronic payment transaction is authorized if the consumer conducting the transaction is properly authenticated and has sufficient funds or credit to conduct the transaction. Conversely, if there are insufficient funds or credit in the consumer's account, or if the consumer's portable payment device is on a negative list (e.g., it is indicated as possibly stolen), then an electronic payment transaction may not be authorized. In the following description, an "acquirer" is typically a business entity (e.g., a commercial bank) that has a business relationship with a particular merchant. An "issuer" is typically a business entity (e.g., a bank), which issues a portable payment device such as a credit, debit, or stored value card to a consumer. Some entities may perform both issuer and acquirer functions.

In standard operation, an authorization request message is created during a consumer purchase of a good or service at a Point Of Service (POS) using a portable payment device (such as a credit or debit card). The portable payment device may be a wireless telephone. The authorization request message can be sent from the POS terminal located at a merchant to the merchant's acquirer, to a payment processing system, and then to an issuer. An "authorization request message" can include a request for authorization to conduct an electronic payment transaction. It may include one or more of an account holder's payment account number, currency code, sale amount, merchant transaction stamp, acceptor city, acceptor state/country, etc. An authorization request message may be protected using a secure encryption method (e.g., 128-bit SSL or equivalent) in order to prevent data from being compromised.

Referring to FIG. 1, one implementation of a payment system 100 compatible with a FIPPD is illustrated. The payment system 100 includes, a plurality of merchants 140 associated with one or more acquirers 150, and issuers 170. Each merchant 140 may have one or more merchant locations 140(a), 140(b) with acquirers 150(a) and 150(b) associated with those merchant locations, where 'a' can be a value from 1 to 'A' and 'b' can be a value from 1 to 'B'. The different merchant locations 140(a), 140(b) may be affiliated with a single merchant. A consumer 120 may purchase a good or service at the merchant locations 140(a), 140(b) using a FIPPD 130. The acquirers 150(a), 150(b) can communicate with an issuer 170 via a payment processor 160.

The FIPPD 130 may be in many suitable forms. As stated previously, the FIPPD 130 can be a mobile device that incorporates a contactless element such as a chip for storing payment data (e.g., a BIN number, account number, etc.) and a wireless data transfer (e.g., transmission) element such as an antenna, a light emitting diode, a laser, etc.). The FIPPD 130 may also incorporate the ability to perform debit functions (e.g., a debit card), credit functions (e.g., a credit card), or stored value functions (e.g., a stored value card).

The payment processor 160 may include data processing subsystems, networks, and other means of implementing operations used to support and deliver authorization services, exception file services, and clearing and settlement services for payment transactions. The acquirer 150, payment processor 160, and the issuer 170 make up a payment processing system 180. The payment processing system 180 is able to process credit card transactions, debit card transactions, and other types of commercial transactions.

The payment processor 160 may include a server computer. A server computer is typically a powerful computer or cluster of computers. For example, the server computer can be a large mainframe, a minicomputer cluster, or a group of servers functioning as a unit. In one example, the server computer may be a database server coupled to a web server. The payment processor 160 may use any suitable wired or wireless network, including the Internet.

The merchant 140 typically has a Point Of Service (POS) terminal (not shown) that can interact with the FIPPD 130. Any suitable Point Of Service terminal may be used, including device (e.g., card) readers. The device readers may include any suitable contact or contactless mode of operation. For example, exemplary card readers can include RF (radio frequency) antennas, magnetic stripe readers, etc., to interact with the FIPPD 130.

As noted, a desirable element of the standard electronic payment transaction system is the entity responsible for the account management functions involved in the transaction. Such an entity may be responsible for ensuring that a user is authorized to conduct the transaction (via an authentication process), confirm the identity of a party to a transaction (via receipt of a personal identification number), confirm a sufficient balance or credit line to permit a purchase, and reconcile the amount of purchase with the user's account (via entering a record of the transaction amount, date, etc.). Also, such an entity may perform certain transit related services in addition to the standard transaction services.

For example, the payment transaction processing entity may be responsible for communicating with one or more transit agency computer systems to provide authentication data (by generating and/or distributing keys) for control of access to transit systems, process data obtained from a transit user's mobile device to associate transit system user identification data with an account used to pay for the transit expenses, generate billing records for transit activities, etc.

Note that a trusted third party may also perform some or all of these functions, and in that manner act as a clearinghouse for access control data and/or transit activity data processing.

Figure 2:
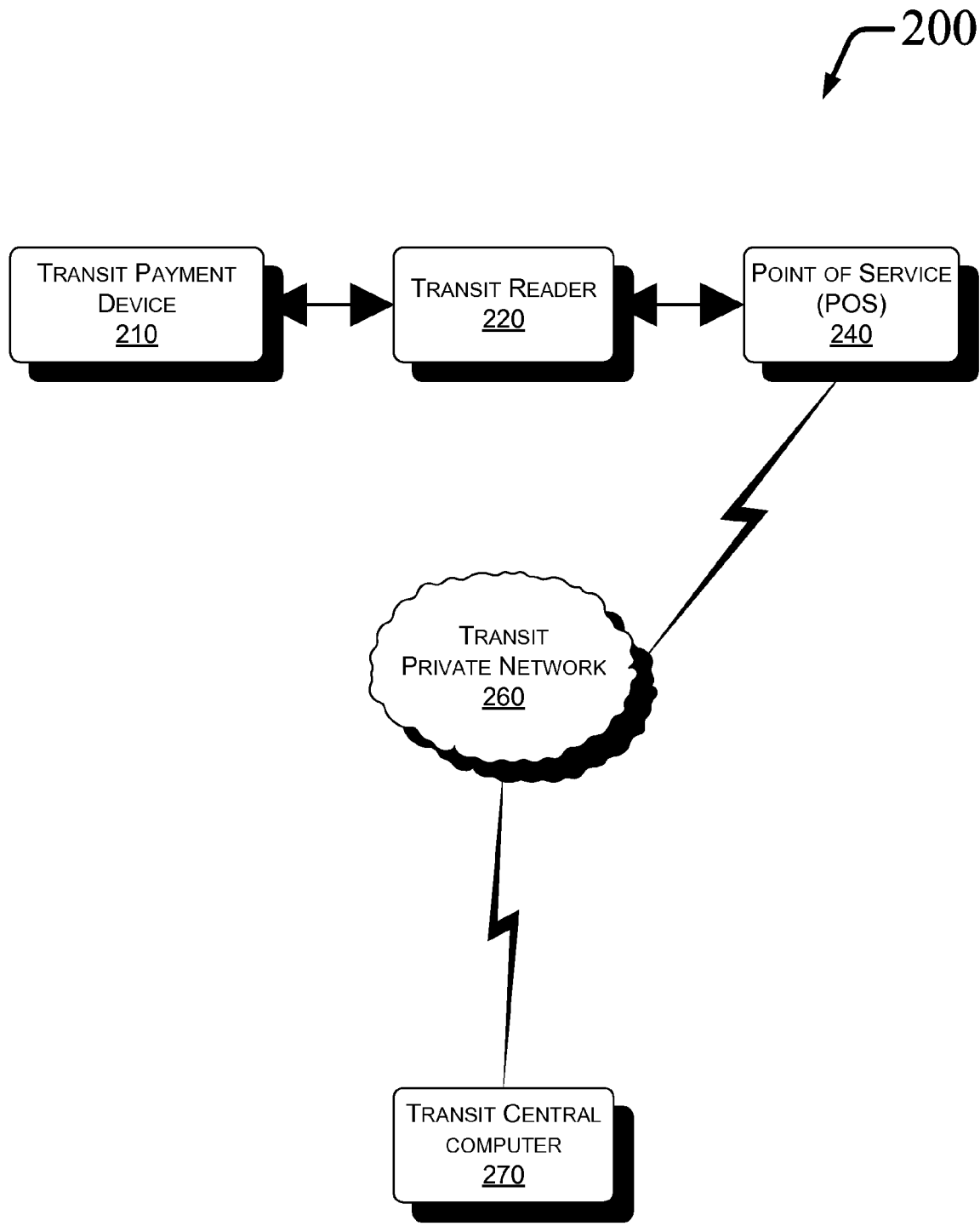
FIG. 2 is a block level diagram illustrating an exemplary closed transit processing system.

Referring now to FIG. 2, transit fare collection is typically accomplished off-line in a closed transit processing system 200—the transit portable payment device 210 being issued by the transit system and the fare being calculated at the transit POS 240. The transit POS 240 may be a farebox or a turnstile with a transit system reader 220, such as a contactless card reader. The transit POS 240 collects and stores data such as the card identification number, card transaction history, card validity information, etc. The transit POS 240 and the transit portable payment device 210 authenticate themselves, typically utilizing encryption algorithms and keys. The transit POS 240 then requests the data from the transit portable payment device 210. The transit reader 220 and transit POS 240 process the data from the transit reader 220 and apply the fare policy rules for the transit agency. Processing of the fare rules will result in a determination of a fare value, followed by the decreasing from the transit portable payment device 210 of value or number of rides, or application of a pass (like a monthly pass.) The transit portable payment device 210 is updated through writing information back to the transit portable payment device 210 as necessary to document the transaction on the transit portable payment device 210.

If one transaction has an impact on the cost of the next transaction, as in the case of a discounted transfer when the patron transfers to the next leg of the journey, the appropriate transit portable payment device 210 history is available at the time of the transfer transaction. The information stored on the transit portable payment device 210 is available to make determination of the cost of the fare at the moment of the transaction. There is no need to query any other computers or servers to complete the transaction at the fare device.

Figure 3:
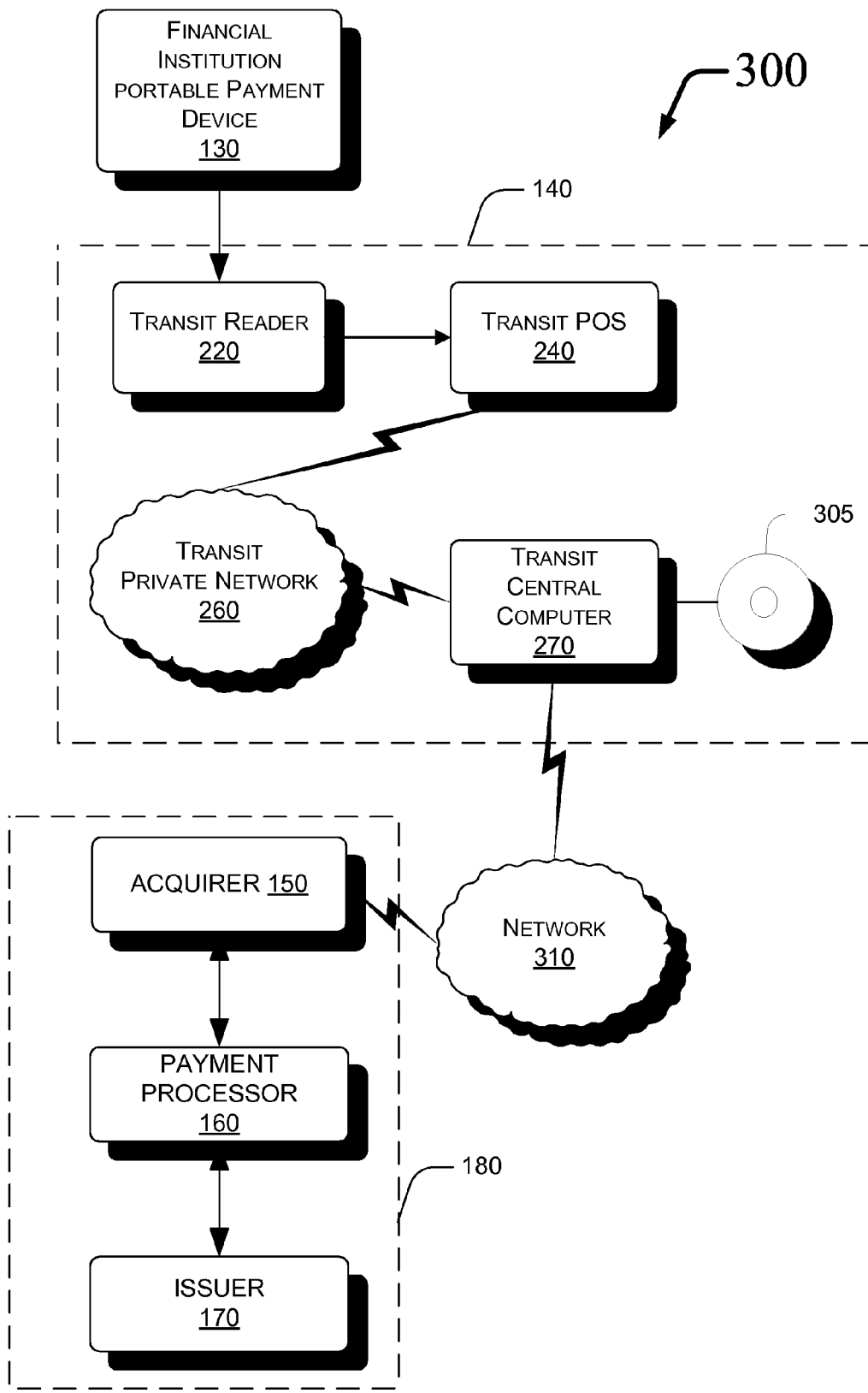
FIG. 3 is a block level diagram illustrating an exemplary open transit processing system which is compatible with the payment processing system seen in FIG. 1.

After the transaction is complete, the fare transaction information is typically transferred to transit central computer 270 via the transit private network 260 for purposes of accounting, reporting, and fraud determination. Transit portable payment device 210 is uniquely identified by a transit account number, and is tracked for out of balance values, velocity, or use-rules. If the fraud rules are broken and the transit portable contactless device 210 is determined to have associated fraud, the transit portable payment device 210 number may be placed on a hot list kept in a storage that is accessible to the transit central computer, such as is seen in FIG. 3 at reference number 305 and described below. The hot list is typically sent to each transit POS 240 for use as a validation component at the time of the transaction. If the transit portable payment device 210 identification number is found on the hot list, the transit portable payment device 210 may be denied for entry into the transit system.

Referring now to FIG. 3, a FIPPD 130 can be used in an off-line/on-line sequence to conduct a transaction within an open transit system 300. Implementation of a transit fare application does not allow the opportunity for the payment transaction to go on-line to the issuer for authorization. This is due in part to the need to process a transaction in less than a second, typically within about 300 ms—a transit system industry standard, to allow 30 to 45 patrons per minute into the transit facility (hereafter referred to as the "access period"). The ability to go on-line in the transit environment may also be problematic because of the lack of real time communication and network systems. For example, buses are on the road and may not have wireless or other communication systems to allow real-time dialogue with any other systems outside of the bus. Consequently, one implementation combines an off-line/on-line sequence of processes to conduct a fare transaction, such as has been illustrated in FIG. 3.

For example, a rider may present the FIPPD 130 at the transit POS having the transit reader 220. The transit reader 220 can capture from the FIPPD 130 financial institution account information, such as Magnetic Stripe Data (MSD), in an off-line mode (e.g.; without communicating with the payment processing system 180). The transit reader 220 may read all of track data, or just part of the track data such as a primary account number (PAN) associated with the FIPPD 130. The track data, along with other transaction information, such as the time of day and the location of the transit POS 240, can be transmitted to the transit central computer 270 via the transit private network 260. At this point, however, the fare value may not be known. Nevertheless, the consumer is then given access to the transit facility.

The transaction information can be stored and analyzed at the transit central computer 320. The transit central computer 320 may have a database containing transit transaction history for all riders that use the transit system. The transit transaction history can be updated with each FIPPD 130 usage at the transit POS 240 or it may be updated on a batch basis.

The transit transaction history may be accessed to calculate the value of a fare off-line. For example, a set of the transit transaction history within the database can be accessed based on the PAN read from the FIPPD 130 at each transit event (e.g., entry, transfer, or exit) using the FIPPD 130; the transit transaction history may then be put into a chronological order of transit events; and the transit fare can be derived using the chronology of transit events on the basis of predetermined transit agency rules and policies.

Once the fare value is derived, the transaction can be processed on-line in communication with the payment processing system 180, as would a retail transaction with the merchant 140. The fare value can be transmitted to the payment processing system 180 via the on-line financial institution network 310. Once transmitted, the fare value can be authorized, cleared and settled—as described for the payment system 100—with the merchant 140.

Figure 4:
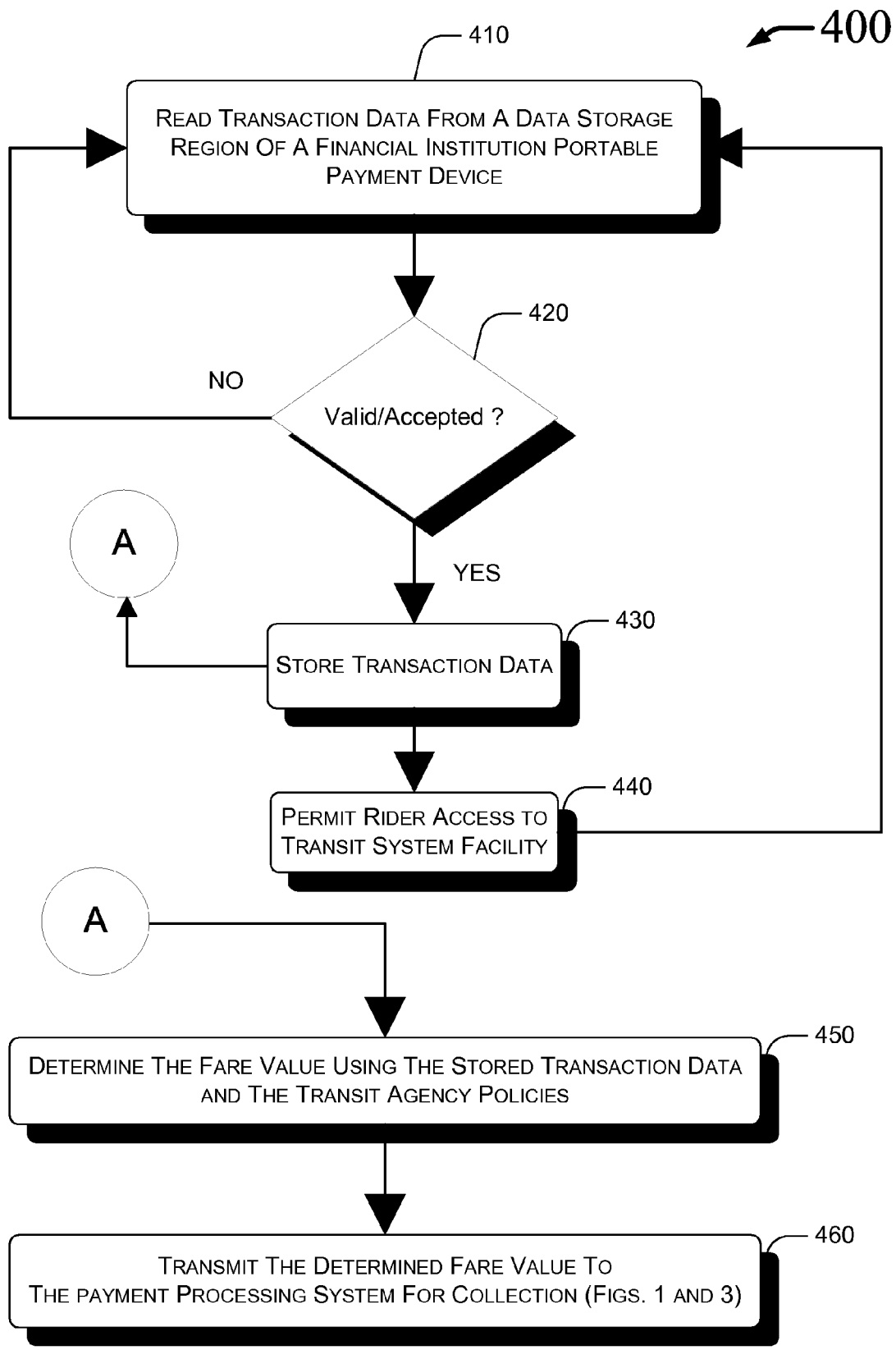
FIG. 4 is a flow chart illustrating an exemplary process through which a financial institution portable payment device can be used in the environment of the open transit processing system illustrated in FIG. 3.

Referring to FIG. 4, a flow chart is used to illustrate an exemplary process 400 through which the FIPPD can be used in the open transit system 300. Process 400 begins at step 402 where data from the data storage region of the FIPPD 130 associated with an account within the payment system 100 is read. The data can include all of the track data or subcomponent thereof. For example, the data can include an identification for the FIPPD associated with the account such as the PAN. The data can be read by the transit reader 220 such as a contactless reader reading a contactless payment card that has been issued by an issuer in a payment processing system. The transaction data can include the data read at the transit reader 220 along with other transaction information such as the date, the time of day, a merchant identification code, the location of the transit POS 240, etc.

At step 420, optional authentication evaluations can be conducted at the transit POS 240 including rudimentary checks on the status of the FIPPD 130 or a variations of on-line authorization with the payment processing system 180. For example, the expiration date of the FIPPD 130 can be checked at the transit POS 240 or a Luhn algorithm analysis, also referred to as Modulus 10 analysis, can be done wherein a checksum formula is used to validate an identification number such as the PAN. Moreover, a balance inquiry can be formed in a communication addressed to the issuer 170. A balance inquiry may perform the function of initiating a quick check on the balance associated with a PAN on the payment processing system 180 associated with the FIPPD 130. The balance inquiry might not include a risk analysis that is sometimes done during the authentication component of a conventional transaction. Consequently, the balance check might be completed within the access period.

Alternatively, or in combination, the authentication step 420 may include a check against the transit agency's white list or black list at the transit POS 240 to determine if the rider should be permitted access into the transit facility. The white list may be a list of eligible portable payment devices, such as the FIPPD 130, that can be permitted access to the transit facility. The black list may be a list of ineligible portable payment devices, such as the FIPPD 130, that cannot be permitted access to the transit facility. The white list or black list may consist of identifiers for portable payment devices, such as the PAN stored on a FIPPD 130 or a proxy thereof. The transit agency may place a portable payment device on the negative list based on various parameters. For example, the portable payment device may have been reported stolen by a consumer, the portable payment device may have been a stored value card that has exhausted its value, or the portable payment device may have been used in a repeated fashion over a course of a day such that fraud may be suspected. Stated otherwise, the "velocity" with which the portable payment device is detected as having been used may indicate that fraud is being used to gain access to a transit facility; a transit agency may have a host of policies and rules that, when transgressed, place a portable payment device on the negative list kept in the database 305 in communication with transit central computer 270.

The transit agency may also place a consumer device on a white list or black list based on a transmission originating from the payment processing system 180. For example, the transmission may have included a notification from the issuer 170 that there has been a declined a transaction involving the FIPPD 130 in the past or that the payment processing system's 180 risk assessment on the FIPPD 130 has fallen above a threshold such that the transit agency may wish to place the FIPPD 130 on the negative list.

The white list or black list can be hosted at the database 305 in communication with the transit central computer 270, yet be accessible at the transit POS 240 instead of maintaining a white list or a black list at the transit POS 240 itself. In this manner, the white list or black list can be updated without having to make changes at each transit POS 240. The transit central computer 270 need not be a single computer. Rather, the transit central computer 270 may be a network of computers such as a network with nodes for a set of transit readers 220. The nodes may be connected to each other, either laterally and/or hierarchically.

At step 430, the transaction data can be transmitted to the transit central computer 270 for storage and analysis. The transit central computer 270 may use database 305 to contain transit transaction history for riders that use the transit system over time. The transit transaction history can include information such as the date and time of a transit event, an identification of the transit POS 240, and at least some of the data read from the data storage region of the FIPPD 130. The transit transaction history can be updated with each FIPPD 130 event at the transit reader 220 or on a batch basis.

At step 440, the rider is given access to the transit facility. The transit facility may be a subway, a bus, a ferry, a trolley, a hovercraft, a train, and other forms of transportation as are typically found within a transit system. Steps 410 to 440 may occur off-line within a short period of time such as less than about one second or over a period of time not exceeding the access period (e.g., 300 ms). Steps 410 through 440 repeat as respective riders interact with the transit POS 240.

At step 450, the transit transaction history stored in step 430 may be accessed to calculate off-line (e.g.; not in real time) the value of a fare using the stored transaction data and the transit agency policies. For example, a set of the transit transactions can be accessed based on the FIPPD 130 identification information, such as the FIPPD's 130 PAN; the set of transit transactions may then be ordered chronologically by transit events (e.g.; entry, transfer, or exit); and the transit fare can be derived using the chronology of transit events based on predetermined transit agency rules and policies. For example of predetermined fare policies, the transit agency may charge: a flat fee of $2.00 (U.S. dollars) for entry into the system. Other examples of predetermined fare policies include evaluating the fare value based on: an entry into the facility of the transit system; an exit from the facility of the transit system; a distance for one entry and a corresponding exit; a transfer from one facility of the transit system to another facility of the transit system; the sequential number of each transfer in a predetermined time period; a direction of travel in the transit system; a classification of the rider corresponding to the FIPPD 130 (e.g., concessions based on age, student status, or frequent ridership); peak and off peak travel time periods; a calendar holiday travel time period; and combinations of the foregoing. Those in the art are familiar with the potential rules and policies that may apply in calculating a transit fare.

Sometimes several FIPPDs 130 may have the same PAN. For example, several employees of the same employer may have each have respective FIPPDs 130 that are all associated with a single account (e.g.; PAN) within the payment processing system 180. As such, the respective fare calculations for those employees using their respective FIPPDs 130 to commute during the same time within the transit system will need to take into consideration which card is being used by each employee within the same PAN.

At step 460, the transit agency may transmit one of more calculated fare values to the payment processing system 180 for collection based on various payment models. For example, the model used by the transit agency to request payment for the calculated fare values from the payment processing system 180 may be a pay per each use model, a pre-paid model, or an aggregation of multiple calculated fare values model.

In the pay per each use model, when the transit fare is determined the fare is transmitted to the payment processing system 180 for collection. Therefore, the transit fare may be directly sent to the payment processing system 180. Alternatively, the calculated transit fare may be batched with other calculated transit fares for a plurality of FIPPDs 130 over a period of time and then sent on an intermittent basis to the payment processing system 180 for collection.

Once the transit fare is sent to the payment processing system 180 it can be processed according to typical protocol for merchants 140. For example, each $2.00 transit fare can be authorized, settled, and cleared through the payment processing system 180, the transit agency can be paid, and the consumer can receive the assessed transit fare(s) in a monthly statement corresponding to their PAN.

In the stored value model, the account associated with the FIPPD 130 is accessed through the payment processing system 180 at the transit system. For example, the rider can ask the transit agent at a payment booth to deduct an amount from the rider's credit card associated with the payment processing system 180 prior to the rider going to a turnstile to seek entry into a subway of the transit system. The transit agent may then conduct an on-line transaction with the payment processing system 180 so as to charge a value against the account, for example $50.00 (U.S. dollars). The transit system can then maintain a transit account associated with the FIPPD 130, for example, such that the transit account may be maintained at the transit central computer 270. When the rider wishes to take the subway, the rider may go to the turnstile, wave the FIPPD 130 up to the transit reader 220 in a contactless reading operation. The transit POS 240, in this case the turnstile, may transmit the transit event to the transit central computer 270 via the transit private network 260. Once a plurality of such transit events are completed for the PAN associated with FIPPF 130 (such as both an entry and an exit to the subway system for the rider), the transit fare can be calculated and deducted from the transit account at the transit central computer 270. In this case, the on-line transaction to record the transit event occurs before the off-line transaction of the transit central computer 270 to collect the value of the fare from the payment system 180.

The rider may set up the transit account such that the account is "topped off" at predetermined intervals—such as when the end of the month arrives or when the transit account has reached a threshold lowest value such as $5.00 (U.S. dollars), whereby a predetermined amount is charged to the account that is associated with the FIPPD 130 in the payment processing system 180. Therefore, the transit system may conduct an on-line transaction, for example for $50.00 (U.S. dollars) with the payment processing system 180 once the predetermined interval is reached.

In the aggregation model, the transit fare involving FIPPD 130 may be accumulated based on a predetermined algorithm prior to sending the transit fare to the payment processing system 180. The predetermined algorithm cumulate transit fares may be over time, over an accumulated value of transit transactions, or over a predetermined number of transit transaction, and combinations of the foregoing. For example, the transit agency may accumulate transit fares involving one or more FIPPDs 130 that occur over a week period prior to transmitting same to the payment processing system 180. Alternatively, the transit agency may accumulate transit fare values based on a threshold value. For example, once the accumulated transit fare value reaches twenty dollars ($20.00 US), the transit agency may transmit the accumulated fare to the payment processing system 180. In another example, the transit agency may accumulate transit transactions based on the quantity of rider that a rider takes on the transit system—such as when a rider has completed five (5) rides using the same FIPPD 130, where each ride had its own fare value (e.g., $4.00, $0.50, $1.00, and $5.00 U.S. dollars). The transit agency would then transmit the accumulate fares for as a total value to the payment processing system 180 collection.

Figure 5:
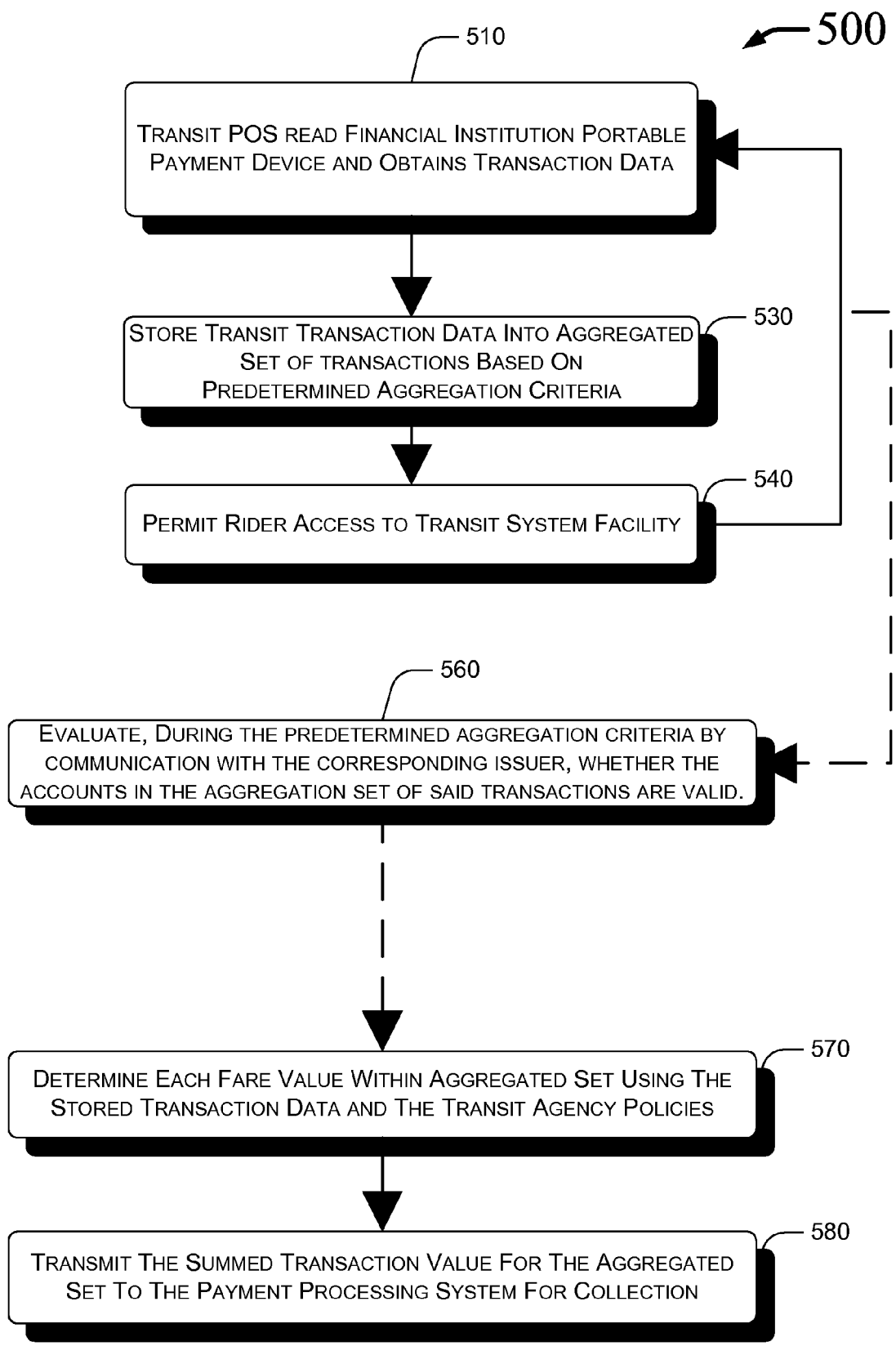
FIG. 5 is a flow chart illustrating an exemplary process of aggregating a plurality of a consumer's transactions involving a financial institution portable payment device prior to collection of the transactions.

Referring to FIG. 5, a flow chart illustrates an exemplary process 500 for aggregating a plurality of a rider's transit transactions involving FIPPD 130 prior to collection of the transactions through the payment processing system 180.

Process 500 begins at step 510, where data from the data storage region of the FIPPD 130 associated with an account within the payment processing system 180 is read at the transit reader 220. As stated previously, the data can include all of the track data or subcomponent(s) thereof. For example, if a plurality of the FIPPDs 130 is each associated with the same account (e.g., each FIPPD 130 having the same PAN) then enough access transaction account identification data can be read, such as the PAN field and the issuer 170 discretionary field within the tracks of the FIPPD 130. In this manner, each of the FIPPD 130 may be distinguished from each other FIPPDs 130 with the same PAN used within the transit system for each transit transaction. Process 500 then moves to step 530.

At step 530 the access transaction data is stored into an aggregated set of transactions according to a predetermined criteria. The predetermined criteria can require that such aggregation occur over a time period, as a quantity of transactions, as a value in excess of threshold amount of one or more transactions, or combinations thereof. In step 530, the aggregated set of access transactions are placed in storage, such as at the transit POS 240, at the transit central computer's 270 database 305, or at both. Each access transaction may be retrieved from the storage for analysis or transit fare processing. For example, the access transaction in the aggregation set may be retrieved from the transit POS 240 several hours after the access transaction was first read at the transit reader 220.

At step 540, the rider gains access to the transit facility. The rider may enter the transit facility even if the value of the access transaction is unknown, such as where the transit fare may be based multiple individual transit events each involving the same FIPPD 130 (e.g.; an initial ride with several transfers in a fare schema based upon distance of travel). As such, in some implementations, the rider will gain access to and of one or more facilities of the transit system prior to fare(s) for the ride being assessed to the FIPPD 130 that is being used by the rider. Accordingly, those of skill in the art will appreciate that the predetermined aggregation criteria being used by a transit system should balance the objective to minimize the risk of uncollected fares for each FIFFP 130 with the objective of minimizing transaction fees assessed by the payment processing system of its services, including account validation, balance checks, authorization, clearance, settlement, etc.

Process 500 repeats steps 510 through 540 for each rider using a FIPPD 130 for the access transaction. Preferably, these steps, including both validation and storage thereof, will occur in a short period of time, more preferably in less that about one second, and most preferably in an access period of about 300 ms.

Periodically, during the predetermined aggregation criteria, an evaluation is performed at step 560 of process 500. This evaluation can be performed communication with the corresponding issuer of an account of a transaction with the merchant. The evaluation is to determine whether the accounts in the aggregation set of the transactions are valid. Thus, step 560 is a kind of query that is performed on the data to determine the validity of usage of the FIPPD 130 for the access transaction that had already occurred. The validation process may be a rudimentary check or a full authorization obtained from the payment processing system 180 as described above. For example, the validation process may include authorization, or subcomponent(s) thereof, such as may be performed by electronic communication with one or more members of obtained the payment processing system 180.

At step 570, the fare value for each fare within the aggregated set of fares is determined based on stored access transaction history and transit agency policy. Several transit events (e.g., a charge to enter, a charge to exit, a charge for distance of travel on a transit system, etc.) may make up one fare. Moreover, several fares may make up one aggregated set of fares. For example, a transit system may charge one dollars ($1.00 US) for entry into a transit facility and fifty cents ($0.50 US) for each transfer between facilities in a single direction of travel. Each Monday, a rider may enter the transit facility and make four (4) transfers using the FIPPD 130. The transit system may store each of those rider as a 'transit event'

(e.g.; one (1) initial entry followed by four (4) transfers) on each Monday for one (1) month. At the end of the month, the transit system may place into a chronological order that month's access transactions for each account that is associated to each FIPPD 130 that had been used during that month for access into one or more facilities of the transit system. This ordered set of transit transactions can then be used at step 550 of process 500 to determine the total transit fares to be assessed to each FIPPD 130 and its corresponding account. By way of example, if each of the rider's Monday transit fares cost three dollars ($3.00 US), then the aggregated set for that month would equal twelve dollars ($12.00 US), that is four trips at three dollars each. Once the total of the fares within the aggregate set of access transactions are known, process 500 can optionally move to step 560.

Optionally, at step 580 the transaction fares can be communicated to the payment processing system 180 for collection. Based on the payment model being used by the transit system, this communication may consist of a single transit transaction for which just one (1) fare is assessed to one FIPPD 130 and its corresponding account (e.g., pay per each use model), an aggregate total amount of fares that exceeds a predetermined threshold (e.g., a batch of access transactions involving a plurality of FIPPDs 130 for which the total fares of the batch exceeds One Thousand Dollars ($1000.00 US), or an aggregated set of fares for the FIPPD 130 (e.g., an aggregation of all access transitions for one FIPPD 130 over a month's period).

Process 500 allows for settlement and collection to be conducted on an aggregated set of such individual transactions. As such, transaction fees assessed to the merchant 140 by a payment processing system can be minimized, although risk to the merchant 140 of the uncollected value for the aggregated transactions is increased. The fee is minimized because settlement and collection fees are not applied to each individual transaction, although some of the risk of uncollected transaction values can be reduced by requiring that at least some of the transactions will validate the FIPPD 130 be used for the transaction. For example, a consumer may purchase a cup of coffee from a coffee shop every morning using an FIPPD 130 ($2.00 U.S. dollars). Each morning's coffee purchase transaction may be sent to the transaction processing system 180 for a cursory validation check (e.g., is this FIPPD 103 a "lost card"). At the end of the week, the coffee shop may transmit the aggregated sum of all of that consumer's purchases over the week to the transaction processing system 180 ($10.00) for collection. In this manner, the coffee shop only pays the significantly larger settlement and collection fees just once on the total of ten dollars rather than paying these fee five (5) time for each of the $2.00 daily purchases, although a significantly smaller fee may be charged for each of the five cursory validation checks.

It should be understood that the present invention can be implemented in the form of control logic, in a modular or integrated manner, using software, hardware or a combination of both. Based on the disclosure and teachings provided herein, a person of ordinary skill in the art will appreciate other ways and/or methods to implement the present invention.

It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method comprising:
at each of a plurality of transit system readers in a transit system, for each of a plurality of riders, each seeking to conduct an access transaction for access to a facility of the transit system using a payment device issued by an issuer in a payment system, wherein the issuer is a financial institution, performing the operations of:
receiving transit data from a payment device, wherein the transit data includes account data identifying an account issued by the issuer;
validating the transit data against a blacklist comprising rejected payment devices;
communicating with the issuer, via a payment processor, to conduct a balance inquiry on the account issued by the issuer, prior to permitting the rider access to the facility;
permitting the rider access to the facility of the transit system without authorizing a transfer from the account with the issuer;
storing the transit data for each said access transaction into an aggregation set of said access transactions, wherein the receiving, validating, communicating, permitting, and storing are all performed within a time period not exceeding one second;
deriving, using a predetermined transit policy of the transit system, a fare for one or more access transactions; and
requesting from the issuer, after a predetermined threshold associated with an account has been met, that the issuer authorize and settle a transfer of funds, from the account to an account of the transit system, wherein the transfer amount is the aggregate fare charged to the account for the duration of the predetermined threshold,
wherein the predetermined threshold is selected from the group consisting of a predetermined time period, a predetermined number of access transactions, a predetermined sum of the value of one or more access transactions, or a combination of the foregoing,
wherein fare discounts may be given when a transfer from one facility of the transit system is made to another facility of the transit system, wherein:
a plurality of said payment devices are associated with each said account;
the transit data further includes access transaction account identification data associated with each said account; and
the access transaction account identification data includes an identification for the particular said payment device of said plurality of said payment devices that are associated with the account.

2. The method as defined in claim 1, wherein the permitting occurs prior to deriving the cost of the access transaction.

3. The method as defined in claim 1, wherein the steps further comprise, subsequent to each said access transaction, deriving, using a predetermined transit policy of the transit system, a fare for a corresponding one of more said access transactions.

4. The method as defined in claim 1, wherein said deriving comprises ordering the access transactions in the aggregation set by chronology of occurrence and by the account in the information therein.

5. The method as defined in claim 1, wherein one or more said access transactions correspond to a transit event, to which a fare is assessable to a corresponding said payment account, each said transit event is selected from the group consisting of:
an entry into the facility of the transit system;
an exit from the facility of the transit system;

a distance for one said entry and a corresponding said exit;
a transfer from one said facility of the transit system to another said facility of the transit system;
the sequential number of each said transfer in a predetermined time period;
a direction of travel in the transit system;
a classification of the rider corresponding to the payment device;
peak and off peak travel time periods;
a calendar holiday travel time period; and
combinations of the foregoing.

6. The method as defined in claim 1, wherein the steps further comprise retrieving the aggregation set of said access transactions from the plurality of transit system readers.

7. The method as defined in claim 6, wherein the retrieving occurs at a plurality of hours after each said access transaction in the aggregation set of said access transactions.

8. The method as defined in claim 1, wherein the information stored for each said access transaction comprises the date and time thereof, an identification of the transit system reader, and at least some of the transit data.

9. The method as defined in claim 1, wherein:
the validating further comprises evaluating, using the account, whether the access transaction is authorized; and
the permitting further comprises, for each said access transaction that is authorized, permitting the rider to conduct the access transaction to gain said access.

10. The method as defined in claim 9, wherein the validating comprises using an offline processing system that is not in communication with the issuer.

11. The method as defined in claim 10, wherein the offline processing system cross-references the account to a list of other said accounts to determine whether the account is authorized for the access transaction.

12. The method as defined in claim 9, wherein the evaluating comprises using an online processing system, remote from each said transit system reader.

13. The method as defined in claim 12, wherein the online processing system cross-references the account to a list of other said accounts to determine whether the account is authorized for the access transaction.

14. The method as defined in claim 9, wherein the communicating further comprises:
forming a balance inquiry communication addressed to the issuer; and
receiving, in response to the communication addressed to the issuer, a balance of the account in a communication.

15. The method as defined in claim 1, wherein the payment device is selected from the group consisting of a credit card, a debit card, a stored value card, and combinations thereof.

16. The method as defined in claim 1, wherein the payment device is within a mobile device selected from the group consisting of a personal digital assistant, a wireless telephone, and an expert system including a substrate having embedded therein a contactless element including a chip capable of use as a transaction payment mechanism for each said access transaction.

17. A non-transitory computer readable medium comprising instructions which, when executed by hardware, the hardware performs the operations of:
receiving transit data from a payment device, wherein the transit data includes account data identifying an account issued by the issuer, wherein the issuer is a financial institution;
validating the transit data against a blacklist comprising of rejected payment devices;
communicating with the issuer, via a payment processor, to conduct a balance inquiry on the account issued by the issuer, prior to permitting the rider access to the facility;
permitting the rider access to the facility of the transit system without authorizing a transfer from the account with the issuer;
storing the transit data for each said access transaction into an aggregation set of said access transactions, wherein the receiving, validating, communicating, permitting, and storing are all performed within a time period not exceeding one second;
deriving, using a predetermined transit policy of the transit system, a fare for one or more access transactions; and
requesting from the issuer, after a predetermined threshold associated with an account has been met, that the issuer authorize and settle a transfer of funds, from the account to an account of the transit system, wherein the transfer amount is the aggregate fare charged to the account for the duration of the predetermined threshold,
wherein the predetermined threshold is selected from the group consisting of a predetermined time period, a predetermined number of access transactions, a predetermined sum of the value of one or more access transactions, or a combination of the foregoing,
wherein fare discounts may be given when a transfer from one facility of the transit system is made to another facility of the transit system, and wherein:
a plurality of said payment devices are associated with each said account;
the transit data further includes access transaction account identification data associated with each said account; and
the access transaction account identification data includes an identification for the particular said payment device of said plurality of said payment devices that are associated with the account.

18. A method comprising a plurality of steps each being performed by hardware executing software, wherein the steps include:
at each of a plurality of transit system readers in a transit system, for each of a plurality of riders each seeking to conduct an access transaction for access to a facility of the transit system using a payment device issued by an issuer in a payment system wherein the issuer is a financial institution:
receiving transit data from a payment device, wherein the transit data includes account data identifying an account issued by the issuer;
validating the transit data against a blacklist comprising of rejected payment devices;
communicating with the issuer via a payment processor, to conduct a balance inquiry on the account issued by the issuer, prior to permitting the rider access to the facility;
permitting the rider access to the facility of the transit system without authorizing a transfer from the account with the issuer;
storing the transit data for each said access transaction into an aggregation set of said access transactions, wherein the receiving, validating, communicating, permitting, and storing are all performed within a time period not exceeding one second;
deriving, using a predetermined transit policy of the transit system, a fare for one or more access transactions; and
requesting from the issuer, after a predetermined threshold associated with an account has been met, that the issuer authorize and settle a transfer of funds, from the account to an account of the transit system, wherein the transfer amount is the aggregate fare charged to the account for the duration of the predetermined threshold, wherein the predetermined threshold is selected from the group consisting of a predetermined time period, a predetermined number of access transactions, a predetermined sum of the value of one or more access transactions, or a combination of the foregoing; and deriving, subsequent to each said access transaction and using a predetermined transit policy of the transit system, a fare for a corresponding one of more said access transactions in the aggregation set by ordering the access transactions in the aggregation set by chronology of occurrence and by the account in the information therein, wherein fare discounts may be given when a transfer from one facility of the transit system is made to another facility of the transit system, and wherein:

a plurality of said payment devices are associated with each said account;

the transit data further includes access transaction account identification data associated with each said account; and the access transaction account identification data includes an identification for the particular said payment device of said plurality of said payment devices that are associated with the account.

19. The method as defined in claim 18, wherein the communicating comprises communication with the issuer of the account in a message scheme selected from the group consisting of:

a status check of the account issued by the issuer;

an assessment of the funds availability for the account issued by the issuer;

a balance inquiry on the account issued by the issuer; and other payment network message processes.

20. The method as defined in claim 19, wherein the message scheme is associated with a service cost assessed by the corresponding said payment system that is less than that of:

an authorization of one said access transaction by the payment system; and a settlement of one said access transaction by the payment system.

21. The method as defined in claim 18, wherein one or more said access transactions correspond to a transit event to which a fare is assessable to a corresponding said payment account, each said transit event is selected from the group consisting of:

an entry into the facility of the transit system;

an exit from the facility of the transit system;

a distance for one said entry and a corresponding said exit;

a transfer from one said facility of the transit system to another said facility of the transit system;

the sequential number of each said transfer in a predetermined time period;

a direction of travel in the transit system;

a classification of the rider corresponding to the payment device;

peak and off peak travel time periods;

a calendar holiday travel time period; and combinations of the foregoing.

22. The method as defined in claim 1, wherein the payment device is updated by writing transit information to the payment device to document a transaction in order to discount the next transaction.

23. The method as defined in claim 22, wherein the derived fare is discounted due to the transfer between travel events.

24. The method as defined in claim 1, further comprising decrementing a counter from the payment device after permitting the rider access to the transit facility.

25. The method as defined in claim 1, wherein the fare for the access transaction is unknown when the rider is permitted access to the facility.

26. The method as defined in claim 1, wherein the validating uses a modulus 10 analysis.

27. The method as defined in claim 1, further comprising differentiating multiple riders having the same account based on the access transaction account identification data, the access transaction account identification data including one or more of data from a primary account number (PAN) field and an issuer discretionary field.

28. The method of claim 1, wherein transit data is stored at one of a transit point-of-service (POS) and a transit central computer database.

29. The method of claim 1 further comprising validating expiration data of the payment device prior to permitting the rider access to the facility.

30. The method of claim 1 further comprising performing a Modulus 10 analysis to validate an identification number of the payment device.

* * * * *

UNITED STATES PATENT AND TRADEMARK OFFICE
CERTIFICATE OF CORRECTION

| | | |
|---|---|---|
| PATENT NO. | : 8,407,082 B2 | Page 1 of 1 |
| APPLICATION NO. | : 11/681176 | |
| DATED | : March 26, 2013 | |
| INVENTOR(S) | : Dixon et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1188 days.

Signed and Sealed this
Twenty-third Day of December, 2014

Michelle K. Lee
*Deputy Director of the United States Patent and Trademark Office*